(12) United States Patent
Lee

(10) Patent No.: US 9,915,386 B2
(45) Date of Patent: Mar. 13, 2018

(54) CLAMP FOR PIPE

(71) Applicant: Ho Young Lee, Yongin-si, Gyeonggi-do (KR)

(72) Inventor: Ho Young Lee, Yongin-si, Gyeonggi-do (KR)

(73) Assignee: Ho Young Lee, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/911,773

(22) PCT Filed: Aug. 14, 2013

(86) PCT No.: PCT/KR2013/008157
§ 371 (c)(1),
(2) Date: Feb. 12, 2016

(87) PCT Pub. No.: WO2015/023022
PCT Pub. Date: Feb. 19, 2015

(65) Prior Publication Data
US 2016/0186902 A1    Jun. 30, 2016

(30) Foreign Application Priority Data

Aug. 14, 2013  (KR) .................. 10-2013-0096531

(51) Int. Cl.
*F16L 21/06*   (2006.01)
*F16L 3/10*   (2006.01)

(52) U.S. Cl.
CPC .............. *F16L 21/06* (2013.01); *F16L 3/1075* (2013.01); *F16L 3/1041* (2013.01)

(58) Field of Classification Search
CPC ........ F16L 3/1075; F16L 3/1033; F16L 3/105; F16L 3/1041; F16L 3/1066; F16L 3/1016;
(Continued)

(56) References Cited

U.S. PATENT DOCUMENTS 2,689,141 A * 9/1954 Kiekhaefer ............. F16L 23/06
24/279
2,775,806 A * 1/1957 Love ....................... F16L 23/06
24/271
(Continued)

FOREIGN PATENT DOCUMENTS

DE       8033016 U1 *  5/1994  ............. F16L 23/06
DE       4402680 A1 *  8/1995  ......... F01N 13/1805
(Continued)

*Primary Examiner* — David Bochna
*Assistant Examiner* — James A Linford
(74) *Attorney, Agent, or Firm* — Cantor Colburn LLP

(57) ABSTRACT

Provided is a pipe clamp for clamping the joint portion of pipes. The pipe clamp includes a body including a first body, which is hingedly coupled at an upper portion thereof to a link and is provided at a lower portion thereof with a fastening protrusion, the fastening protrusion having therein a fitting groove and a threaded hole connected to the fitting groove, and a second body, which is hingedly coupled at an upper portion thereof to the link and is hingedly coupled at a lower portion thereof to a fastening screw, the link hingedly coupled to the upper portions of the first and second bodies, the fastening screw coupled to the lower portion of the second body, a fastening bar, which is provided at one side thereof with a nut, and which is provided on an outer surface thereof with a thread and is provided therein with a threaded hole, and hinge pins for hingedly coupling the fastening screw and the link to the body.

4 Claims, 8 Drawing Sheets

(58) Field of Classification Search
CPC ......... F16L 3/10; F16L 3/1008; F16L 3/1025;
F16L 3/1058; F16L 3/1083; F16L 3/1091;
F16L 21/06; F16L 23/04
See application file for complete search history.

(56) References Cited

U.S. PATENT DOCUMENTS

| | | |
|---|---|---|
| 4,341,406 A | 7/1982 | Abbes et al. |
| 5,681,135 A * | 10/1997 | Simonson ........... F16B 23/0084 |
| | | 411/14 |
| 7,891,713 B2 | 2/2011 | Bekkevold |

FOREIGN PATENT DOCUMENTS

| | | | | |
|---|---|---|---|---|
| EP | 0042168 A1 * | 12/1981 | .............. | F16L 23/06 |
| EP | 0566287 A1 * | 10/1993 | .............. | F16L 23/06 |
| FR | 2427539 A1 * | 12/1979 | .............. | F16L 23/04 |
| KR | 20-0398123 Y1 | 10/2005 | | |
| KR | 20-0399466 Y1 | 10/2005 | | |
| KR | 10-1017961 B1 | 3/2011 | | |

* cited by examiner

CLAMP FOR PIPE

TECHNICAL FIELD

The present invention relates to a pipe clamp for clamping the joint portion of pipes.

BACKGROUND ART

In order to prevent a connected portion, that is, a joint portion, of general pipes from being displaced and to prevent generation of gaps at the joint portion, a pipe clamp is used. As shown in FIG. 1, the pipe clamp includes a pair of bodies 1, a link 2 for rotatably connecting the pair of bodies 1, a fastening bar 3 for fastening the pipe clamp, and a screw 4 for moving the fastening bar 3.

The body 1 is provided with a fastening protrusion 1a into which the fastening bar 3 is fitted for coupling thereto. The fastening protrusion 1a is provided at a portion thereof that has an anti-rotation protrusion 1b for preventing the rotation of the fastening bar 3, which is coupled to the fastening protrusion 1a.

However, such conventional pipe clamps have the following problems.

1. When the joint portion of pipes is relatively small compared to the pipe clamp, there is a problem whereby the joint portion is not firmly clamped by the pipe clamp.

2. When the joint portion of pipes is relatively large compared to a pipe clamp, the fastening bar is not firmly fastened to the fastening protrusion. Accordingly, there is a problem whereby the pipe clamp becomes separated from the joint portion of the pipes.

3. Although the fastening bar coupled to the fastening protrusion is prevented from being rotated by the anti-rotation protrusion, there is a problem whereby the fastening bar is rotated and thus released when an external impact or the like is applied to the anti-rotation protrusion.

DISCLOSURE

Technical Problem

Therefore, the present invention has been made in view of the above problems, and it is an object of the present invention to provide a pipe clamp, which is able to clamp any pipes regardless of the diameter of the joint portion of the pipes and is not released from the clamped state, even by an external impact, once the joint portion of the pipes is clamped by the pipe clamp.

Technical Solution

In accordance with an aspect of the present invention, the above and other objects can be accomplished by the provision of In accordance with another aspect of the present invention, there is provided a pipe clamp including a body including a first body, which is hingedly coupled at an upper portion thereof to a link and is provided at a lower portion thereof with a fastening protrusion, the fastening protrusion having therein a fitting groove and a threaded hole communicating with the fitting groove, and a second body, which is hingedly coupled at an upper portion thereof to the link and is hingedly coupled at a lower portion thereof to a fastening screw, the link hingedly coupled to the upper portions of the first and second bodies, the fastening screw coupled to the lower portion of the second body, a fastening bar, which is provided at one side thereof with a nut, and which is provided on an outer surface thereof with a thread and is provided therein with a threaded hole, and hinge pins for hingedly coupling the fastening screw and the link to the body.

The first body and the second body may have respective holes for enabling a user to check the clamped state of a pipe clamp.

The link may include a first link including a hinge and a second link having a fitting groove formed therein, wherein the hinge of the first link is fitted into the fitting groove formed in the second link, and is hingedly coupled thereto.

The fastening screw may include a screw and a coupler, the coupler having a guide hole having a greater diameter than the hinge pins.

The link may have a guide hole having a greater diameter than the hinge pins.

Advantageous Effects

According to the present invention, there is provided a pipe clamp, in which a link connecting a pair of clamp bodies to each other is configured to be foldable, thereby enabling the pipe clamp to clamp the joint portion of pipes having various sizes, and in which a thread formed in a fastening protrusion is threadedly engaged with a thread formed on the outer surface of a fastening bar, thereby preventing the pipe clamp from being released from the clamped state due to external impact once the pipe clamp has clamped the joint portion of pipes.

BEST MODE

Hereinafter, an embodiment of the present invention will be described with reference to the accompanying drawings. The embodiment, which will be described below, is provided only to illustrate a preferred construction of the present invention, and should not be construed as limiting the technical scope of the present invention. The present invention may be variously modified without departing from the technical scope or spirit of the present invention.

Figure 1:
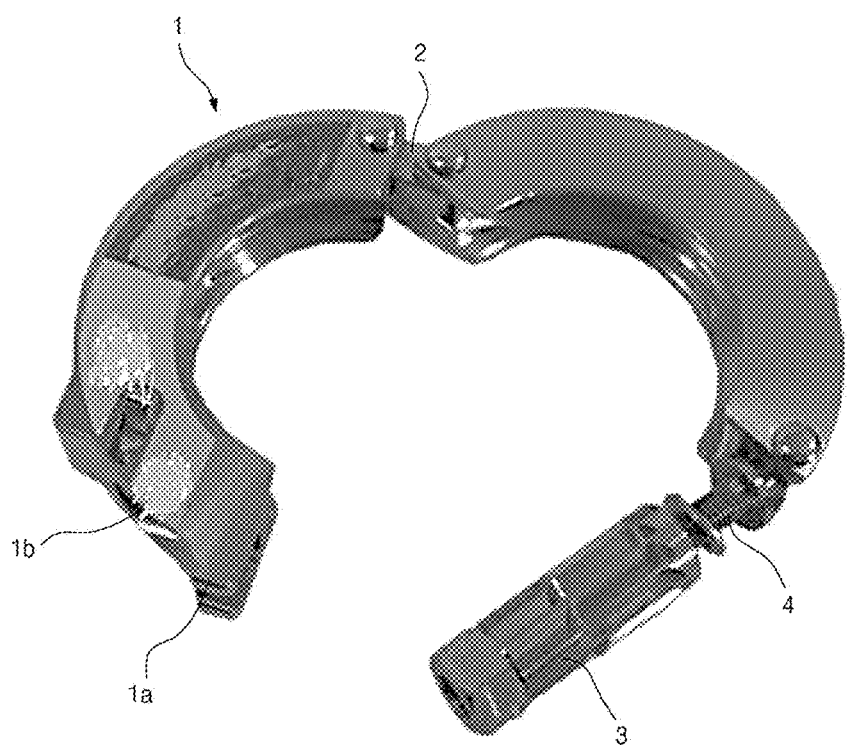
FIG. 1 is a perspective view showing a conventional pipe clamp.
Figure 2:
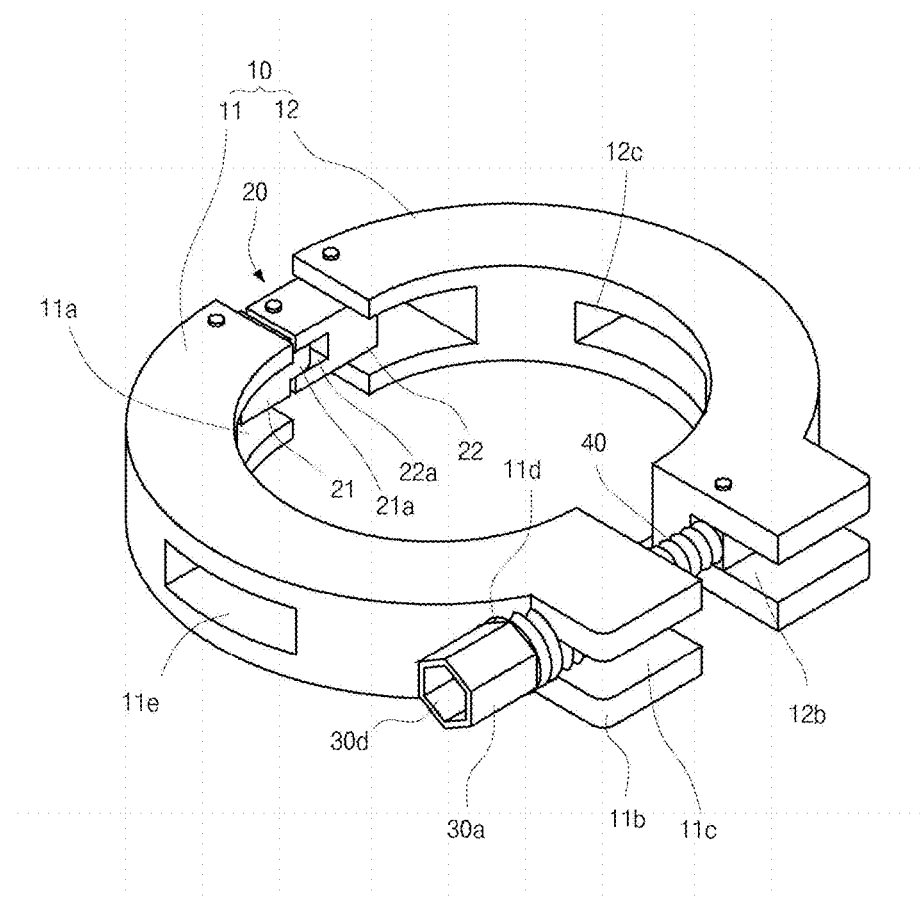
FIG. 2 is a perspective view of a pipe clamp according to an embodiment of the present invention.
Figure 3:
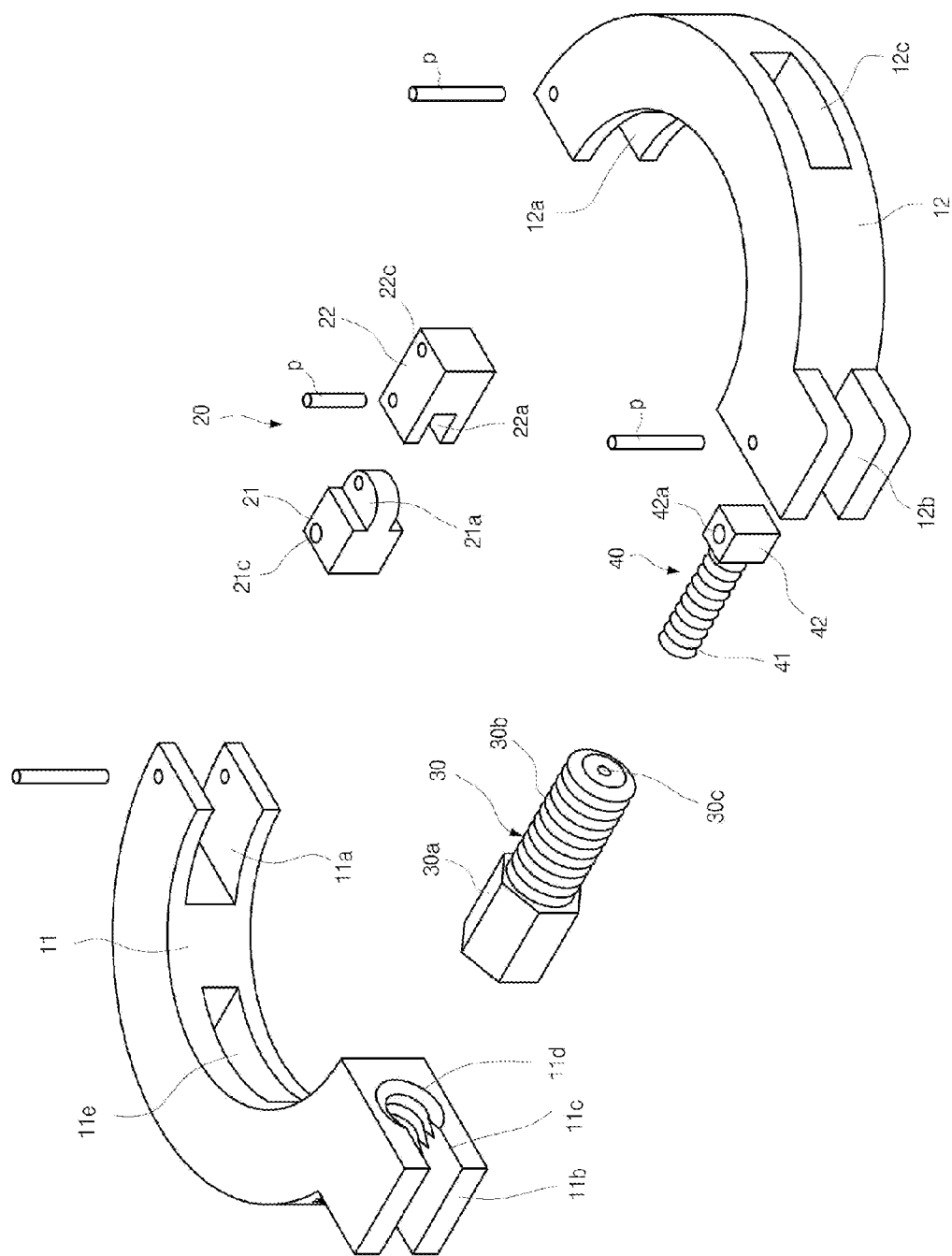
FIG. 3 is an exploded perspective view of the pipe clamp shown in FIG. 2.
Figure 4:
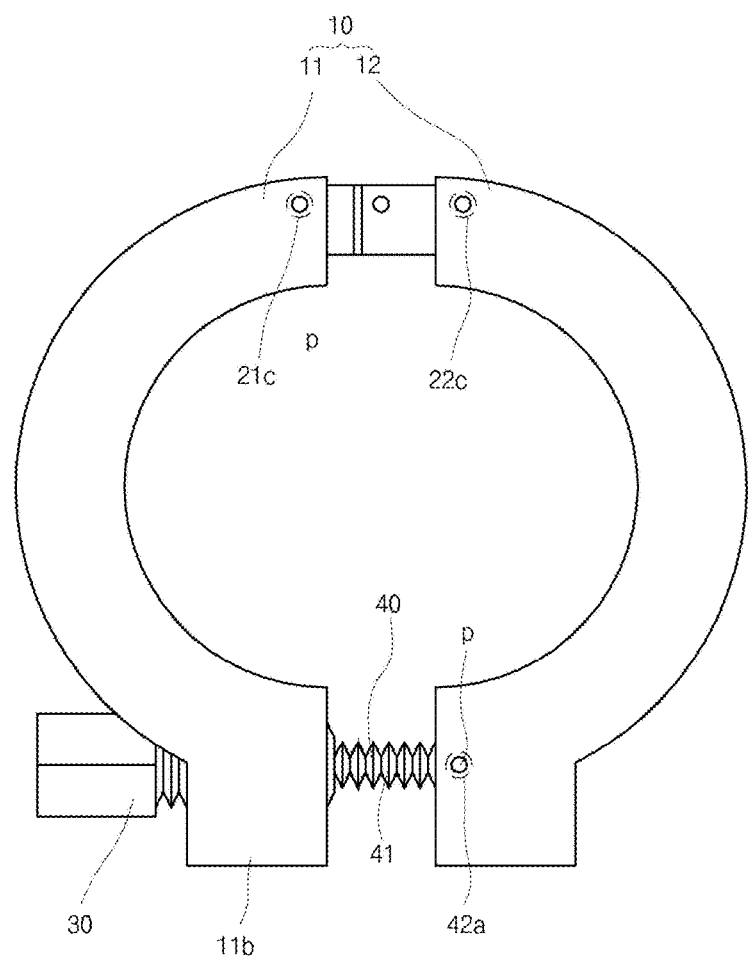
FIG. 4 is a front view of the pipe clamp.
Figure 5:
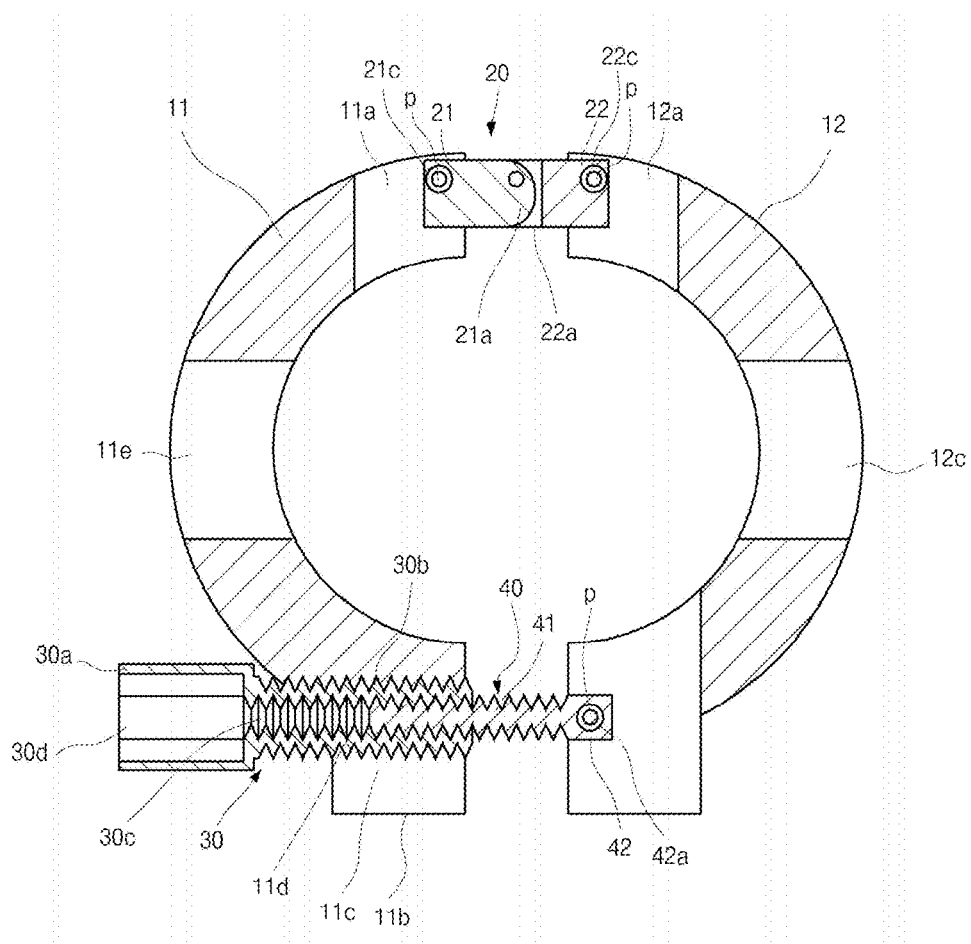
FIG. 5 is a cross-sectional view of the pipe clamp.

FIG. 2 is a perspective view of a pipe clamp according to an embodiment of the present invention. FIG. 3 is an exploded perspective view of the pipe clamp shown in FIG. 2. FIG. 4 is a front view of the pipe clamp. FIG. 5 is a cross-sectional view of the pipe clamp.

The pipe clamp according to the present invention includes a body 10, a link 20 for coupling the body 10, a fastening bar 30 for fastening the clamp, and a fastening screw 40, which is fitted into the fastening bar 30 so as to allow the fastening bar 30 to slide therealong.

The body 10 is constituted by a pair of bodies, that is, a first body 11 and a second body 12. The first body 11 is provided at an upper portion thereof with a groove 11a for hingedly coupling the link 20. The first body 11 is provided at a lower portion thereof with a fastening protrusion 11b for coupling the fastening bar 30.

The fastening protrusion 11b is provided with a fitting groove 11c into which the fastening screw 40 is fitted, and is provided under the fitting groove 11c with a threaded hole 11d for fastening the fastening bar 30.

The first body 11 is provided in the center thereof with a hole 11c for allowing the state in which pipes are coupled to each other to be checked.

The second body 12 is provided at an upper portion thereof with a groove 12a for hingedly coupling the link 20. The second body 12 is provided at a lower portion thereof with a groove 12b for hingedly coupling the fastening screw 40.

The second body 12 is provided at the center thereof with a hole 12c for allowing the state in which pipes are coupled to each other to be checked.

The link 20 is constituted by a pair of links, that is, a first link 21 and a second link 22, so as to be folded. The first link 21 is provided at a portion thereof with a hinge 21a, and the second link 22 is provided with a fitting groove 22a into which the hinge 21a is fitted so as to be pivotably moved.

The first link 21 and the second link 22 have respective guide holes 21c and 22c into which respective hinge pins P are fitted. The guide holes 21c and 22c have a greater diameter than the hinge pins p.

The first link 21 is fitted into the groove 11a formed in the first body 11, and is hingedly coupled thereto by means of the hinge pin p. The second link 22 is fitted into the groove 12a formed in the second body 12, and is hingedly coupled thereto by means of the hinge pin p.

The hinge 21a, which is provided on the first link 21, is fitted into the fitting groove 22a formed in the second link 22 and is hingedly coupled thereto.

Accordingly, by virtue of the links 21 and 22, which are configured to be folded and provided with the guide holes 21c and 22c, which have a greater diameter than the hinge pins p, the spacing between the first body 11 and the second body 12 may be more freely adjusted.

The fastening bar 30 is provided at one side thereof with a nut 30a having an external thread 30b. The fastening bar 30 is provided therein with a threaded hole 30c into which the fastening screw 40 is engaged.

The nut 30a, which is provided at the fastening bar 30, has a fitting hole 30d into which a hexagonal wrench is fitted. The fitting hole 30d serves to allow a user to fit a tool thereinto and to rotate the tool when a tool cannot be engaged with the outer surface of the nut 30a due to a narrow working space.

The fastening bar 30 is threadedly engaged with the threaded hole 11d formed in the first body 11. Accordingly, the fastening bar 30, which has been threadedly engaged with the threaded hole 11d, is not released even upon external impact.

The fastening screw 40 includes a screw 41 and a coupler 42.

The screw 41 is threadedly fitted into the threaded hole 30c formed in the fastening bar 30. The coupler 42 has a guide hole 42a formed therein. The coupler 42 is fitted into the groove 12b formed in the second body 12, and is coupled thereto by the hinge pin p. The guide hole 42a has a greater diameter than the hinge pin p. Accordingly, the fastening screw 40, which is coupled to the second body 12, may be displaced a predetermined distance.

Consequently, the angle of the fastening bar 30 may be freely adjusted by virtue of the fastening screw 40, which is coupled to the second body 12 so as to be displaced a predetermined distance, whereby the fastening bar 30 may be threadedly fitted into the threaded hole 11d even when the first body 11 and the second body 12 are not spaced apart from each other by a predetermined distance or greater.

The threaded hole 30c formed in the fastening bar 30, the threaded hole 30c formed in the body 10, the thread 30b formed on the fastening bar 30 and the screw 41 provided at the fastening screw 40 are formed so as to have the same threading direction.

Therefore, when the fastening bar 30 is rotated, the fastening bar 30 is moved along the fastening screw 40 and the threaded hole 11d formed in the body 10.

Figure 6:
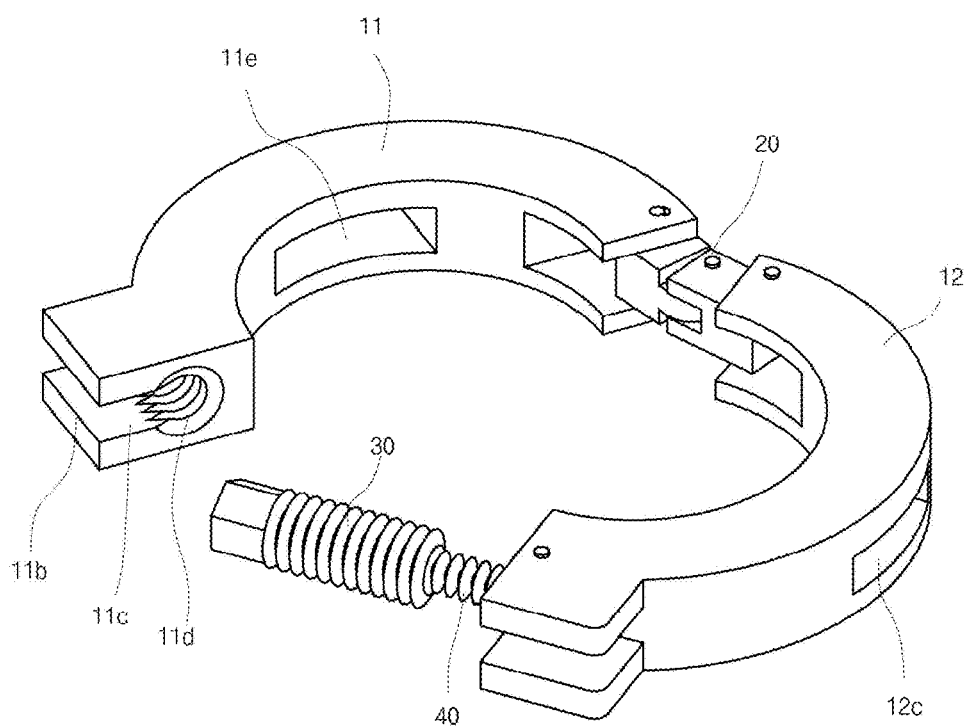
FIGS. 6 to 8 are views showing the pipe clamp in use.
Figure 7:
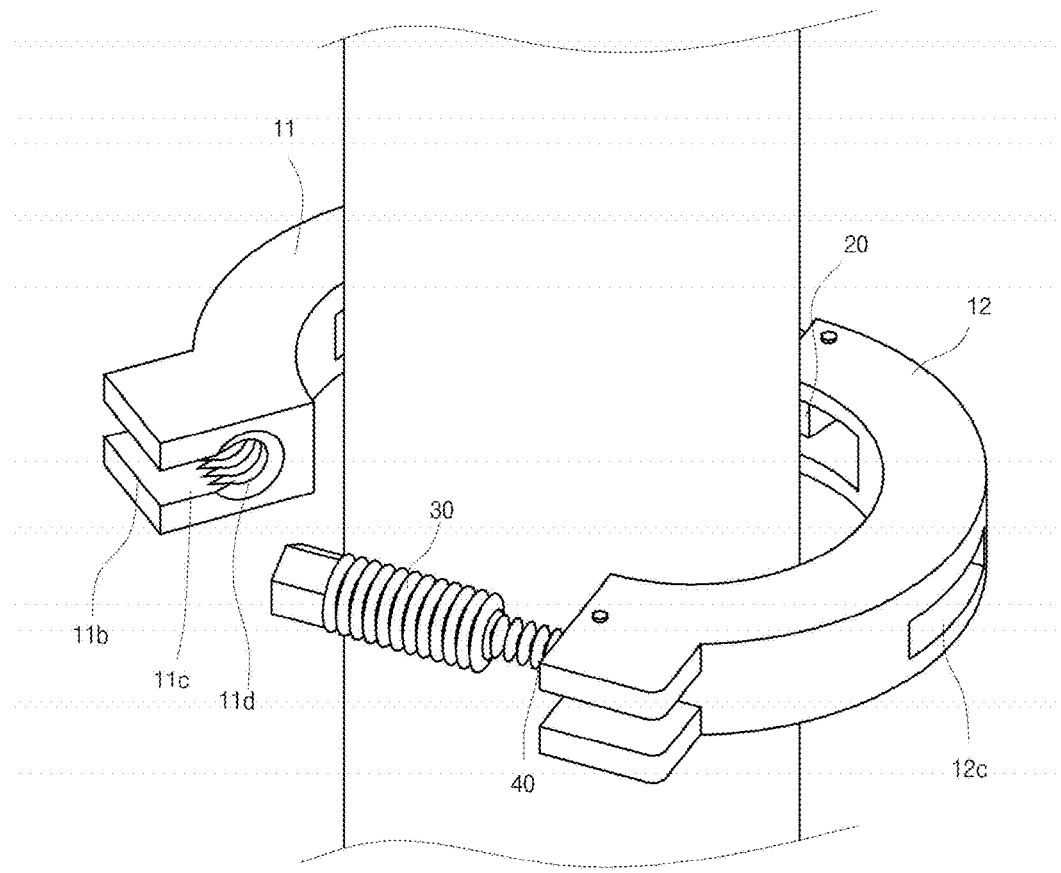
Figure 8:
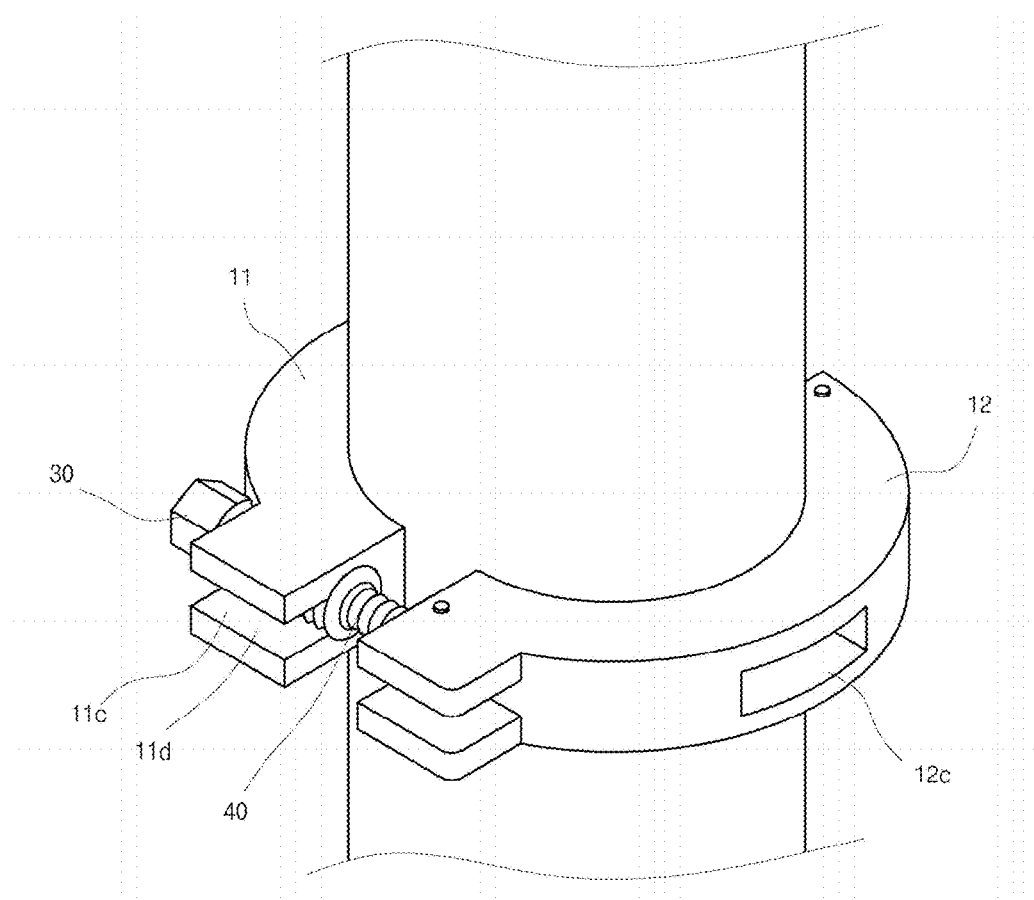

FIGS. 6 to 8 are views showing the pipe clamp in use.

In the operation of the pipe clamp according to the present invention, the first body 11 and the second body 12 are kept open. In this state, the pipe clamp is disposed on the joint portion between pipes, and the first body 11 and the second body 12 of the pipe clamp are caused to closely contact the joint portion of the pipes.

Because the first body 11 and the second body 12 are caused to closely contact the joint portion of the pipes, the first body 11 and the second body 12 are in completely close contact with the joint portion of the pipes.

Subsequently, when the fastening screw 40 is fitted into the fitting groove 11c formed in the coupling protrusion 11b and the fastening bar 30 is rotated, the fastening bar 30 is moved toward the second body 12 by a certain distance, and the fastening screw 40 is simultaneously moved into the fastening bar 30. Consequently, the fastening bar 30 is threadedly engaged with the threaded hole 11d formed in the body 10.

Accordingly, the fastening bar 30 is threadedly engaged with the threaded hole 11d while the fastening screw 40 is moved into the fastening bar 30, whereby the pipe clamp is caused to tightly contact the joint portion of the pipes.

Through the holes 11e and 12c in the pipe clamp, it is possible to check whether the joint portion of the pipes is accurately clamped by the pipe clamp.

The pipe clamp according to the present invention is able to clamp the joint portion of pipes having various sizes by virtue of the link and the fastening screw, which are configured to be folded. In addition, owing to the fastening bar, which is provided on the outer surface thereof with the thread and is threadedly engaged with the threaded hole formed in the first body, a problem whereby the fastening bar is released due to the application of external impact does not occur.

The embodiment of the present invention has been heretofore described. However, the present invention is not limited to the above-described embodiment, and may be variously modified without departing from the technical scope or scope of the present invention.

The invention claimed is:

1. A pipe clamp comprising:
   a link;
   a first body, an upper portion of the first body being hingedly coupled to the link;
   a second body, an upper portion of the second body being hingedly coupled to the link;
   a fastening screw, one end portion of the fastening screw being hingedly coupled to a lower portion of the second body;
   a fitting groove formed at a lower portion of the first body;
   a first threaded hole formed at the lower portion of the first body, wherein a longitudinal lateral portion of the first threaded hole is opened to the fitting groove in such a way that the other end portion of the fastening screw is able to be freely inserted into the first threaded hole via the fitting groove; and a fastening bar including a nut, a thread portion extended from the nut, and a second threaded hole formed inside the thread portion in a longitudinal direction of the thread portion, wherein the fastening screw is able to be coupled into the second threaded hole, wherein the thread portion of the fastening bar is configured to be screw-engaged with the first threaded hole while the second threaded hole of the fastening bar is screw-engaged with the fastening screw freely inserted into first the threaded hole, and wherein the first threaded hole, the thread portion, the second threaded hole and the fastening screw are threaded in a same direction.

2. The pipe clamp according to claim 1, wherein the first body, or the second body, or both have a hole formed between the upper portion and the lower portion for enabling a user to check a clamped state of the pipe clamp through the hole.

3. The pipe clamp according to claim 1, wherein the link includes a first link and a second link hingedly coupled to the first link, the upper portion of the first body is hingedly coupled to the first link, and the upper portion of the second body is hingedly coupled to the second link.

4. The pipe clamp according to claim 1, wherein the fastening screw includes a screw and a coupler, the coupler being hingedly coupled to the lower portion of the second body.

* * * * *